3,336,138
OLEAGINOUS COMPOSITION AND METHOD FOR MAKING SAME
Gunther M. Nakel, Springfield Township, Ohio, assignor to The Procter & Gamble Company, Cincinnati, Ohio, a corporation of Ohio
No Drawing. Filed Mar. 18, 1964, Ser. No. 352,977
6 Claims. (Cl. 99—118)

ABSTRACT OF THE DISCLOSURE

A flavored fat or oil containing $\Delta^1$ pyrroline. This composition imparts an enhanced crusty flavor to bread and rolls and an enhanced buttery flavor to mashed potatoes. Margarine containing $\Delta^1$ pyrroline and having an enhanced buttery flavor.

---

This invention relates to oleaginous compositions containing $\Delta^1$ pyrroline as a flavoring additive. This invention further relates to a method for preparing oleaginous compositions containing $\Delta^1$ pyrroline.

The term "oleaginous compositions" is used herein in its broadest sense to include any natural or artificially produced edible material of a fatty or oily nature; it includes fats and oils derived from naturally occurring glyceride oils such as cottonseed oil, soybean oil, peanut oil, rapeseed soil, sesame seed oil, sunflower seed oil and wallflower seed oil. The oleaginous compositions can vary in consistency from liquid to plastic and may include highly hydrogenated fatty triglycerides. For a liquid shortening a liquid glyceride can contain up to about 10% of substantially completely hydrogenated fatty triglycerides. A liquid shortening suitable for use in this invention is disclosed in Andre and Going, U.S. Patent 2,815,286, granted Dec. 3, 1957. For a plastic shortening a glyceride mixture can contain from about 10% to about 20% of substantially completely hydrogenated fatty triglycerides. A plastic shortening suitable for use in this invention is discolsed in Coith, Richardson and Votaw, U.S. Patent 2,132,393, granted Oct. 11, 1938. The oleaginous compositions can contain minor amounts of conventional anti-oxidants and emulsifiers. The term "oleaginous compositions" is also used herein to include margarine.

Oleaginous compositions along with flour, salt, sugar, milk solids, water and yeast can be used in the preparation of bakery products, such as bread, rolls and buns. Bread is generally prepared from these ingredients by one of three methods: the straight dough method, the sponge dough method and by continuous processing. In the straight dough method all the conventional ingredients are mixed together in a single batch until the dough is developed. Fermentation starts during mixing and continuous until heat is applied during baking. The sponge dough method involves mixing part of the flour, water, sugar and yeast to form a sponge which is then fermented. After the fermentation is complete, the sponge is mixed with the remaining flour and other ingredients for panning, proofing and baking. The practice of making commercial bread by the straight dough and sponge dough methods has been replaced, in many instances, by an absolutely continuous process which is generally described by Baker in U.S. Patent 2,953,460, granted Sept. 20, 1960. The Baker process is essentially a two stage mixing operation: In the first mixing stage, the dough ingredients including a conventional brew are thoroughly blended in a premixer which fully wets and combines all of the dough ingredients to yield a uniformly mixed dough which is essentially undeveloped; in the second mixing stage the dough ingredients are developed in a high speed developer into a dough suitable for baking, after proofing, without further mixing or working.

Dry bakery product mixes, such as dry bread and roll mixes are available for home use. These dry mixes require only the addition of a liquid and baking to form a bakery product. These mixes contain no yeast and depend on chemical leavening agents, such as delta lactone gluconic acid together with sodium bicarbonate, for their ability to rise during baking.

A significantly enhanced crusty flavor is being sought for bakery products, particularly for bread produced by continuous processing and for chemically-leavened bakery products. The term "crusy flavor" is used herein to denote a flavor reminiscent of toasted cereal products, that is, a nutty, cracker-like, slightly bitter, caramelized flavor.

Bakery product flavor is believed to result from the fermentation process where yeast is used in the bakery product preparation and from browning reactions involving the reaction of alpha amino acids present in the flour protein with reducing sugars. Matz, S. A., Bakery Technology and Engineering, 57–61 (The Avi Publishing Co., Inc., Westport, Conn., 1960) lists some of the compounds repeatedly detected in oven condensate, bread crumb, bread crust and fermented solutions. Moriarty, U.S. Patent 3,060,031, granted Oct. 23, 1962, discloses the addition to chemically-leavened bread of the reaction products formed by reacting sugar with at least one amino acid selected from the group of leucine, arginine and histidine. Johnson, J. A. and Miller, B. S., The Bakers' Digest, 52–58 (October 1961) in an article entitled "Browning of Baked Products" disclose a number of amino acid-dextrose reaction products, including a reaction product of proline and dextrose and compare the ultra violet absorption curves of these reaction products with that of bread crust extract. Wiseblatt, L. and Zoumut, H. F., Cereal Chemistry 40, No. 2, 162–169 (March 1963) in an article entitled "Isolation, Origin, and Synthesis of a Bread Flavor Constituent" compare substances with a crackery aroma (a) isolated from fermented liquid brews, (b) isolated from dried bread and (c) resulting from a reaction of dihydroxyacetone and proline and try to show that they are identical. Prolinedextrose and proline-dihydroxyacetone reaction products are known to be complex mixtures of organic compounds. These complex mixtures may contain $\Delta^1$ pyrroline. Although these references illustrate a number of the diverse approaches to the source of bread flavor, none teaches or suggests a method for improving the flavor of bread or of bakery products generally.

In still another area, oleaginous compositions, such as butter, are commonly mixed in with food products, such as mashed potatoes, including reconstituted dehydrated potatoes, such as potato granules and potato flakes in order to enhance their flavor.

In addition, lightly flavored oleaginous compositions, such as margarine, have been flavored. For example, it has become common practice to add up to about 3 p.p.m. of diacetyl (2,3 butanedione) to margarine to supply a more pronounced buttery flavor. The term "buttery flavor" is used herein to denote a flavor reminiscent of fresh butter, that is a creamy, milky flavor.

It is an object of the present invention to provide an oleaginous composition containing a flavor component with high flavor carryover for use in supplying a significantly enhanced flavor to bland or lightly flavored food products such as bakery products, mashed potatoes and reconstituted dehydrated potatoes.

It is a further object of this invention to provide a margarine having a significantly enhanced buttery flavor compared to conventionally manufactured margarine.

It is a further object of the present invention to provide a method for imparting high flavor carryover characteristics to oleaginous compositions.

It has been found that oleaginous compositions containing $\Delta^1$ pyrroline impart a significantly enhanced flavor when used in the preparation of bakery products or mashed potatoes and that margarines containing $\Delta^1$ pyrroline have a significantly enhanced buttery flavor compared to conventionally manufactured margarines.

$\Delta^1$ pyrroline has the chemical structure:

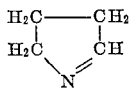

and has been synthesized in the prior art by reacting pyrrolidine and tertiary butyl hypochlorite as shown below and in German Patent 1,054,088, granted Sept. 17, 1959.

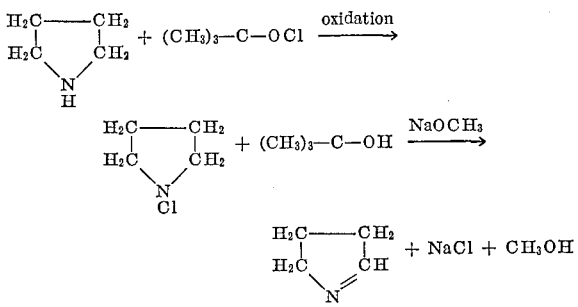

$\Delta^1$ pyrroline can also be formed in other ways; the method of preparation of $\Delta^1$ pyrroline does not form any part of this invention.

Depending on the prevailing pH of the media in which it is dissolved, $\Delta^1$ pyrroline will change from the monomer to the dimer to the iso-trimer to the trimer or to a mixture of these forms. The flavor of the $\Delta^1$ pyrroline will change from an amine-like character of high intensity in the pH range of the monomer, to a crusty note of medium intensity in the pH range of the dimer, to an earthy raw potato note in the pH range of the iso-trimer and finally to a bleached flour note in the pH range of the trimer. When used in concentrations over about 200 p.p.m. by weight of the finished product an amine-like note predominates no matter what the pH. The change of degree of polymerization and the accompanying change of flavor can be obtained starting with any of the mentioned forms of $\Delta^1$ pyrroline. The pH range of the monomeric and polymeric forms of $\Delta^1$ pyrroline are as follows. The monomer is most stable at a pH of about 2 and the dimer is most stable at a pH of about 6. The iso-trimer is most stable at a pH of about 8 and the trimer is most stable at a pH of about 11. Upon addition to a food product $\Delta^1$ pyrroline dissolves in the water phase of the food product. Thus, the flavor contributed by a $\Delta^1$ pyrroline containing oleaginous composition will depend upon the pH of, and its concentration in, the food product in which it is used.

The pH of a food product is the pH of the water phase of the food product and is normally determined by the ingredients generally used in the food product's preparation. Thus, the type of flavor contributed by $\Delta^1$ pyrroline is ordinarily limited by the normal pH range of the food product. It is understood, of course, that if the pH of a food product can be varied without harmful side effects by the addition of some further ingredient, the type of flavor contributed by the $\Delta^1$ pyrroline can also be varied.

The concentration of $\Delta^1$ pyrroline to be added to an oleaginous composition depends in part upon the intended use of the oleaginous composition. It generally ranges from about 0.01 p.p.m. to about 20,000 p.p.m. based on the weight of the oleaginous composition. Thus, if an oleaginous composition, such as margarine, is itself to be flavored, amounts of $\Delta^1$ pyrroline are added to furnish concentrations at the lower end of the above general range. If an oleaginous composition is to be used in food products in which small proportions of oleaginous composition are normally used, such as potato flakes, amounts of $\Delta^1$ pyrroline are added to furnish concentrations at the upper end of the above general range.

The $\Delta^1$ pyrroline can be added to an oleaginous composition either alone or with an ethanol diluent or with other diluents; for example, water and vegetable oils and solid carriers, such as milk solids and starch, together with typical emulsifiers, such as fatty acid monoglycerides, fatty acid diglycerides and vegetable gums, such as gum arabic and gum karaya. When added to an oleaginous composition as a $\Delta^1$ pyrroline-ethanol solution, the $\Delta^1$ pyrroline is first dissolved in ethanol. A concentration of $\Delta^1$ pyrroline ranging from about 0.1% to about 10% based on the total weight of the ethanol-$\Delta^1$ pyrroline solution is convenient. The ethanol-$\Delta^1$ pyrroline solution is then uniformly distributed throughout an oleaginous composition.

The following table shows the concentration of $\Delta^1$ pyrroline necessary to impart a significantly enhanced flavor.

TABLE

| Food Product | Preferred Concentration of $\Delta^1$ pyrroline in food product, p.p.m. | Concentration of $\Delta^1$ pyrroline in oleaginous composition used in preparing food product, p.p.m. | pH of media |
|---|---|---|---|
| Bakery Product | About 1 p.p.m. to about 6 p.p.m. based on total flour | About 5 p.p.m. to about 2,000 p.p.m.[1] | About 5 to about 6.5. |
| Mashed potatoes | About 0.04 p.p.m. | About 4,000 p.p.m. | About 5.6 to about 6. |
| Margarine | About 1.5 p.p.m. or less | About 1.5 p.p.m. or less | About 6.5. |

[1] About 30 p.p.m. to about 400 p.p.m. preferred.

The following examples are illustrative of the present invention and are not to be construed in any way as limiting the scope of the invention:

*Example I*

$\Delta^1$ pyrroline made according to the synthesis disclosed in the previously-mentioned German Patent 1,054,088 was dissolved in ethanol to form a 0.4% by weight solution. 0.5 ml. of the $\Delta^1$ pyrroline solution was then added to 44.6 gms. of an all soybean oil liquid shortening with an I.V. of about 100 and the $\Delta^1$ pyrroline solution was uniformly distributed through the shortening by mixing for about one minute with a spatula. The flavored shortening contained about 45 p.p.m. $\Delta^1$ pyrroline.

Bread dough was then made as follows: A conventional brew was prepared from water, liquid sugar (comprising 32% corn syrup with a dextrose equivalent of about 45, 50% sucrose and 18% water by weight), salt, nonfat milk solids, yeast food, compressed yeast, hard wheat flour, anhydrous monocalcium phosphate and calcium propionate. In the preparation of the brew, 70.8 gms. salt, 48.3 gms. non-fat milk solids, 24.2 gms. yeast food, 483.7 gms. hard wheat flour, 4.5 gms. anhydrous monocalcium phosphate and 2.8 gms. calcium propionate were combined; 105.3 gms. crumbled compressed yeast, 1380 gms. water and 181.4 gms. liquid sugar were then added to the previously combined ingredients, the resulting mixture stirred by hand to smoothness and 460 gms. water added to the smooth mixture; the resulting smooth mixture was stirred for two hours with a magnetic stirrer at a temperature of about 85° F.; 60.4 gms. liquid sugar was then added, the 85° F. temperature maintained for one-half hour and the resulting fermented mixture refrigerated for ten minutes at 40° F. to stop fermentation. 1430 gms. of brew, 45 gms. of the above $\Delta^1$ pyrroline flavored shortening, 1195 gms. hard wheat flour and 28 gms. water solution of oxidizing agents (containing 3.57 gms. potassium bromate and 0.72 gms. potassium iodate for each 1000 gms. water) were mixed in a Hobart Mixer, No. C–100, with a dough hook for one minute at No. 1 speed and for 15 minutes at No. 2 speed and the mixed dough kneaded and formed into five 454 gm. loaves. The loaves were proofed in a 100° F. high humidity cabinet for 45 minutes and baked in a 425° F. oven for 45 minutes. The loaves contained 1.4 p.p.m. $\Delta^1$ pyrroline based on total flour and had a pH of about 6.0. In comparison to control loaves prepared the same as above but without $\Delta^1$ pyrroline, the $\Delta^1$ pyrroline-containing loaves had a significantly enhanced crusty flavor.

*Example II*

Loaves of bread were prepared as in Example I except the ethanol solution contained 1% by weight $\Delta^1$ pyrroline. The shortening contained 112 p.p.m. $\Delta^1$ pyrroline and the baked loaves contained 3.5 p.p.m. $\Delta^1$ pyrroline based on total flour. The loaves of bread had a pH of about 6.0. When compared two days after baking to control loaves prepared the same as in Example I but without $\Delta^1$ pyrroline, the $\Delta^1$ pyrroline-containing loaves had a significantly enhanced crusty flavor.

*Example III*

$\Delta^1$ pyrroline made according to the synthesis disclosed in the previously-mentioned German Patent 1,054,088 was dissolved in ethanol to form a 0.2% by weight solution. 2.2 ml. of the $\Delta^1$ pyrroline solution was then added to 60.0 gms. of an all soybean oil liquid shortening with an I.V. of about 100 and the $\Delta^1$ pyrroline solution was uniformly distributed through the shortening by mixing for about one minute with a spatula. The flavored shortening contained about 70 p.p.m. $\Delta^1$ pyrroline.

Chemically leavened rolls were then made as follows: 76.2 gms. dextrose and 62 gms. of the above $\Delta^1$ pyrroline flavored shortening were creamed together in a Hobart Mixer at No. 1 speed for about two minutes. 765.8 gms. white flour, 37.0 gms. delta lactone gluconic acid, 25.0 gms. bicarbonate of soda, 16.0 gms. salt, 14.0 gms. dicalcium phosphate and 3.8 gms. monocalcium phosphate were added to the creamed dextrose and the resulting mixture mixed for about 5 minutes at No. 1 speed in a Hobart Mixer. To 270 gms. of this mix were added one-half cup milk weighing 120 gms. and one whole egg weighing 48 gms. and these ingredients were mixed in a Hobart Mixer at No. 1 speed for about five minutes. The mixed dough was formed into 15 rolls of assorted twisted shapes with weights ranging from about 25 gms. to about 35 gms. The rolls were baked in a 425° F. oven for 20 minutes. The rolls contained about 5.5 p.p.m. $\Delta^1$ pyrroline based on total flour and had a pH of about 6.5. In comparison to control rolls prepared the same as above but without $\Delta^1$ pyrroline, the $\Delta^1$ pyrroline-containing rolls had a markedly superior crusty flavor.

*Example IV*

Reconstituted mashed potatoes were prepared as follows: One and one-half cups of water were heated to boiling; to this was added one-half cup milk and one-half teaspoon salt. 98 gms. of commercially purchased potato flakes were stirred by hand into the liquid to form reconstituted mashed potatoes. An all soybean oil liquid shortening having an I.V. of about 100 and containing 4000 p.p.m. $\Delta^1$ pyrroline (prepared according to German Patent 1,054,088) was mixed by hand into the reconstituted potato product. The shortening was added to the reconstituted mashed potatoes at a concentration of 0.001% of the total product, and the concentration of the $\Delta^1$ pyrroline in the reconstituted mashed potatoes was 0.04 p.p.m. The reconstituted mashed potatoes had a pH of about 5.8. In comparison to a control prepared the same as above but without $\Delta^1$ pyrroline, the $\Delta^1$ pyrroline-containing mashed potatoes had a significantly enhanced buttery flavor.

*Example V*

One hundred gms. of a commercially purchased margarine was mixed with 0.01 ml. of ethanol-$\Delta^1$ pyrroline solution containing 1% $\Delta^1$ pyrroline. The $\Delta^1$ pyrroline was prepared according to German Patent 1,054,088. The mixing was done with a spatula. The flavored margarine containing 1 p.p.m. $\Delta^1$ pyrroline had a pH of about 6.5. In comparison to the same commercially purchased margarine, the $\Delta^1$ pyrroline-containing margarine had a significantly enhanced buttery flavor.

Oleaginous compositions containing concentrations of $\Delta^1$ pyrroline greater than about 20,000 p.p.m. are also useful for flavoring food products as hereinbefore described. These high concentration $\Delta^1$ pyrroline oleaginous compositions can be advantageously sold commercially. The buyer can dilute these compositions before use.

The foregoing description has been presented describing certain operable and preferred embodiments of this invention. Other variations will be apparent to those skilled in the art.

What is claimed is:
1. An edible oleaginous composition containing as an additive from about 0.01 p.p.m. to about 20,000 p.p.m. $\Delta^1$ pyrroline.
2. An edible oleaginous composition for use in bakery products, the oleaginous composition containing as an additive from about 5 p.p.m. to about 2000 p.p.m. $\Delta^1$ pyrroline.
3. An edible oleaginous composition for use in bakery products, the oleaginous composition containing as an additive from about 30 p.p.m. to about 400 p.p.m. $\Delta^1$ pyrroline.
4. An edible oleaginous composition for use in bakery products, the oleaginous composition containing as an additive about 45 p.p.m. $\Delta^1$ pyrroline.
5. An edible oleaginous composition for use in a potato product, the oleaginous composition containing about 4000 p.p.m. $\Delta^1$ pyrroline.
6. Margarine containing as an additive from about 1 p.p.m. to about 1.5 p.p.m. $\Delta^1$ pyrroline.

References Cited

UNITED STATES PATENTS 3,268,555    8/1966    Wiseblatt et al. _____ 99—140 X

OTHER REFERENCES

Bragg et al., Journal of the Chemical Society, November 1958, pp. 4050–4053.

A. LOUIS MONACELL, *Primary Examiner.*

MAURICE W. GREENSTEIN, *Examiner.*